United States Patent [19]

Muller

[11] 4,147,056

[45] Apr. 3, 1979

[54] MULTI-SEGMENT HEAD-UP DISPLAY FOR AIRCRAFT

[75] Inventor: Hans R. Muller, Kirkland, Wash.

[73] Assignee: Sundstrand Data Control, Inc., Redmond, Wash.

[21] Appl. No.: 836,012

[22] Filed: Sep. 23, 1977

[51] Int. Cl.² .............................................. G01C 21/00
[52] U.S. Cl. .................................................. 73/178 T
[58] Field of Search ......................... 73/178 T, 178 R; 340/27 AT; 244/187, 137 R

[56] References Cited

U.S. PATENT DOCUMENTS

4,057,782  11/1977  Muller .............................. 340/27 AT

Primary Examiner—Donald O. Woodiel
Attorney, Agent, or Firm—Wegner, Stellman, McCord, Wiles & Wood

[57] ABSTRACT

A head-up visual approach instrument having a display of flight guidance information for a two-segment approach to touchdown. The display includes flight path indicia which the pilot aligns with an outside world aiming point, as the touchdown zone of a runway. During the first segment the flight path indicia is positioned as a function of aircraft altitude to define the changing sight angle to the target.

10 Claims, 6 Drawing Figures

FIG. 4A.

MULTI-SEGMENT HEAD-UP DISPLAY FOR AIRCRAFT

RELATED APPLICATIONS

This application is related to my copending application Ser. No. 673,794 filed Apr. 5, 1976, now Muller U.S. Pat. No. 4,057,782.

BACKGROUND OF THE INVENTION

This invention relates to aircraft instrumentation and, more particularly, to a visual approach aircraft instrument which provides a head-up display of flight path indicia against a background of the outside world to direct the pilot through a multi-segment landing approach.

Aircraft instruments providing a head-up display to guide the pilot along a preselected approach path to a target are known. Such instruments are shown in Gold U.S. Pat. No. 3,128,623, Bateman U.S. Pat. No. 3,654,806 and Bateman et al U.S. Pat. No. 3,686,626.

Systems or circuits which provide information to the head-up display are also known. Kirschner U.S. Pat. No. 3,816,005 discloses circuits which generate the indicia on the screen. Muller U.S. Pat. No. 3,851,303 describes the circuitry for developing a complemented pitch signal to drive the pitch scale reference indicia and for developing a signal to position the flight path bar. The above-noted copending application discloses a circuit for providing flare indicia to aid the pilot just before touchdown.

The systems and the displays known to the prior art include a one-segment, pilot-selected, approach path followed by a flare maneuver to touchdown. Briefly, the pilot selects an aiming point in the background of the outside world on the screen and operates the aircraft to align a vertically movable indicia bar on the instrument with the aiming point. When aligned, the aircraft will fly toward the aiming point at a preselected descent angle, as −3°. When the aircraft approaches touchdown, the flare indicia are displayed providing aid to the pilot in landing the aircraft.

A single preselected approach path, as for example −3°, is often undesirable. For example, the terrain around the airport may prohibit the one-segment approach path or, if the airport is located in a metropolitan area, noise abatement regulations may prohibit the aircraft from flying a single-segment approach path.

Accordingly, the need arises for a system which provides a preselected approach path having a first and a second segment, the angle of the first segment being greater than the angle of the second segment.

SUMMARY OF THE INVENTION

A head-up visual approach instrument has a screen on which the pilot views a collimated display of flight guidance information against a background of the outside world for a multi-segment approach. The flight guidance information includes a vertically movable flight path bar on the collimated display. The vertical position of the bar with respect to the display provides the pilot with desired and actual aircraft flight path information. A pitch scale is also provided on the collimated display. The vertical position of the pitch scale with respect to the display provides the pilot with information regarding the pitch of the aircraft. As the pilot operates the controls of the aircraft, its attitude, position, speed and flight path change. The vertical positions of the flight path bar and pitch scale of the collimated display change in response to the operation of the aircraft. During the landing approach, the pilot operates the controls of the aircraft to align the flight path bar with a selected touchdown aiming point in the background on the display. If the pilot controls the aircraft such that the flight path bar remains in alignment with the selected touchdown aiming point, the aircraft will fly a preselected approach path.

The preselected approach path includes a first segment and a second segment, each segment at a different angle with respect to the horizon. Flight along each segment is indicated by the position of the flight path bar. At a selected altitude, the flight path bar is made to drop below the selected touchdown aiming point. The pilot controls the aircraft to again align the indicia bar with the aiming point. When aligned, the aircraft flies the second segment. Near the completion of the second segment, flare indicia is displayed on the screen and the pilot controls the aircraft to align the flight path bar with the flare indicia, causing the aircraft to follow a predetermined flare path to touchdown. Trend information may be provided to the display for indicating the vertical displacement of the aircraft from each segment.

A feature of the present invention is to provide a head-up display which guides the pilot along a preselected multi-segment approach path to touchdown.

Another feature is to provide a means for controlling the flight guidance information on a collimated display of flight guidance information against a background of the outside world to guide the pilot in his execution of the various segments of the multi-segment approach path.

Another feature is to provide a display having a flight path bar so that if the pilot maintains alignment of the bar at or near the end of the runway, the aircraft follows an approach path consisting of a first segment, a second segment and a flare segment.

Another feature of the present invention is to provide trend information to the display whereby a vertical displacement of the aircraft from the first or the second segment is displayed and the pilot, by the manipulation of the aircraft and by viewing the display, causes the aircraft to fly a curved path to intersect the desired approach.

Other advantages and features will become apparent when considering the specification and drawing in which:

DESCRIPTION OF PREFERRED EMBODIMENT

Figure 1:
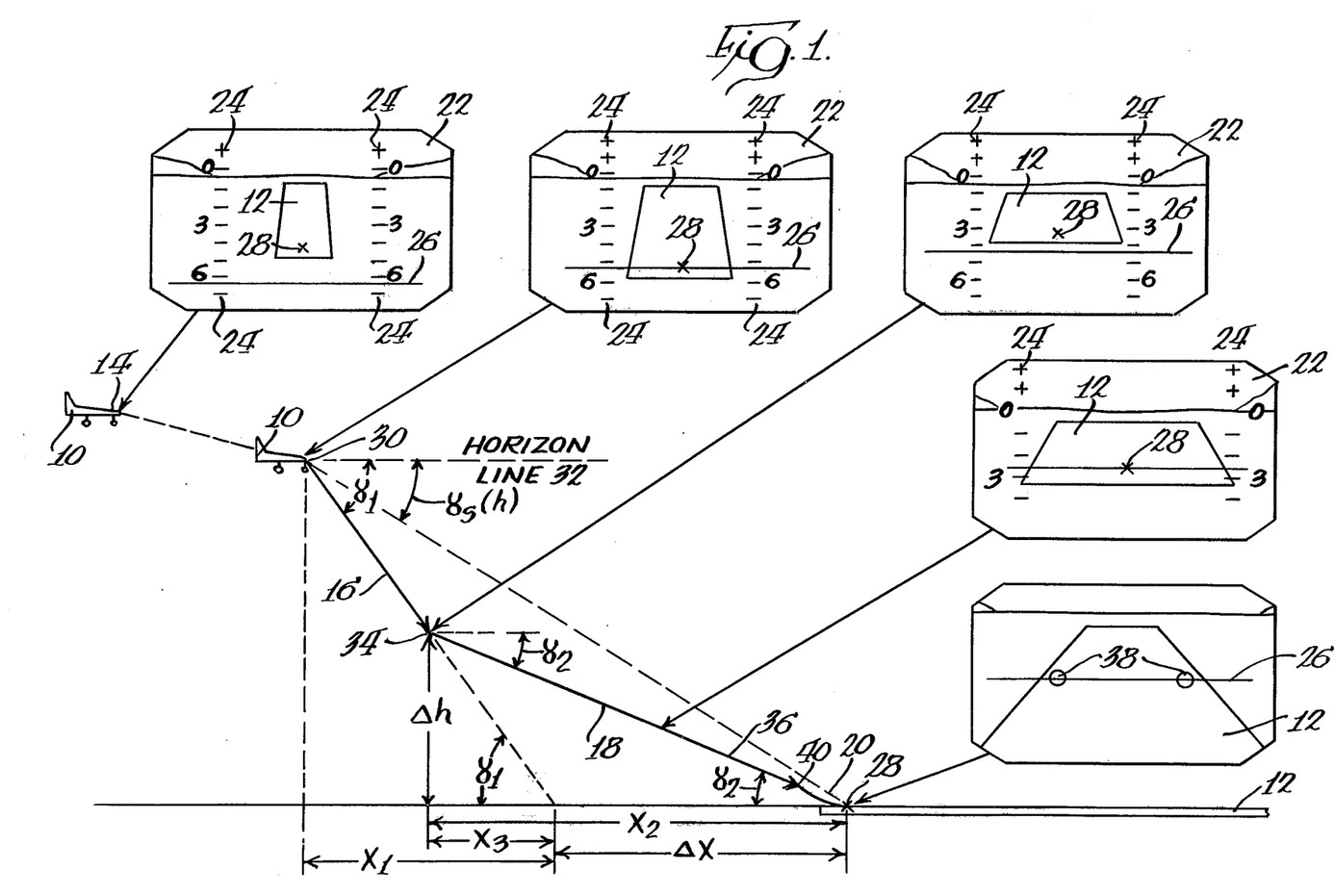
FIG. 1 is a diagram illustrating an aircraft flight path and a sequence of flight guidance information against a background of the outside world for a multi-segment approach and flare to touchdown.

Referring to FIG. 1, an aircraft equipped with a head-up display and multi-segment control circuitry is to be landed on a runway by following a multi-segment approach. The figure depicts a collimated display of flight guidance information against a background of the outside world when the aircraft is located at the various points shown. Various flight guidance information and the angles depicted in the figure are exaggerated for illustration.

When the aircraft 10 is at point 14, the pilot prepares for descent and energizes the head-up display in anticipation of landing on a runway 12. The pilot desires the aircraft 10 to intercept and follow a first approach segment 16, then a second approach segment 18, and finally, a flare path 20 to touchdown on runway 12.

The head-up display 22 is provided with a pitch scale indicia 24 and a flight path indicia bar 26. During flight along the first segment 16 and the second segment 18, the vertical position of the pitch scale 24 with respect to a point on the ground, as seen on screen 22, indicates to the pilot the angle at which the aircraft is displaced from the horizon with respect to such point. The vertically movable flight path bar 26 is responsive to the flight path of the aircraft. The flight path bar 26 is positioned by a command signal from the multi-segment control circuitry, and if flight to a selected point 28 is along the first, second and flare segments of the approach path, flight path bar 26 remains superimposed over selected point 28, as will be explained in greater detail below. As the sighting angle becomes less, as during descent of the aircraft, the flight path bar moves vertically with respect to the horizon. When the flight path intersects the aiming point 28, as seen on display 22, aircraft 10 is positioned at point 30, and the approach path of the landing maneuver is commenced. The pilot manipulates the controls of the aircraft so that the vertically movable flight path bar 26 remains superimposed over the selected aiming point 28, as seen through display 22. The aircraft will fly the first approach segment 16 if the relationship between the flight path bar 26 and aiming point 28 is maintained, as discussed above. The pilot-selected angle of descent along the first segment 16 is indicated as $-\gamma_1$, as for example $-6.5°$ from the horizon line 32, as shown.

When aircraft 10 descends to a selected altitude, $\Delta h$, above the ground, such as point 34, descent along first segment 16 terminates and descent along second segment 18 begins. At transition point 34, a command signal positions flight path bar 26 on head-up display 22 to a point below aiming point 28 as shown. The pilot then manipulates the controls of the aircraft 10 to realign the flight path bar 26 with the aiming point 28. When aligned, the aircraft 10 descends along the second approach segment 18 in accordance with an approach angle $-\gamma_2$, as $-3.5°$. At point 36 in the flight along the second segment 18, as 100 feet above ground, a flare maneuver is initiated. Pitch scale indicia 24 on the head-up display 22 is extinguished and flare indicia dots 38 are displayed. The flare indicia are positioned on the head-up display at a location corresponding to an approach angle $-\gamma_2$. The pilot manipulates the controls of the aircraft to keep the flight path bar 26 aligned with the flare indicia dots 38 and the aiming point 28; the aircraft 10 continues to descend along second segment 18. At the flare initiation point 40, typically on the order of 45 to 50 feet above the ground, both the flare indicia dots 38 and the flight path bar 26 are made to move upwardly toward the horizon. The pilot continues to keep the flight path bar 26 aligned with the dots 38, thereby executing the flare maneuver causing the plane to follow an exponential path to touchdown on runway 12.

A sighting angle $\gamma_s(h)$ along the first segment 16 of the approach path may be expressed in terms of selected approach angles $-\gamma_1$, $-\gamma_2$, $\Delta h$ and the height h of the aircraft 10 above the ground. Referring to FIG. 1, the following relationships are seen:

$$\Delta \chi = \chi_2 - \chi_3 \tag{1}$$

$$\Delta \chi + \chi_1 = \chi_2 - \chi_3 + \chi_1 \tag{2}$$

$$\tan \gamma_1 = \frac{h}{\chi_1} = \frac{\Delta h}{\chi_3} \tag{3}$$

$$\tan \gamma_2 = \frac{\Delta h}{\chi_2} \tag{4}$$

$$\tan \gamma_s(h) = \frac{h}{\Delta \chi + \chi_1} \tag{5}$$

for small angles tan A = A, thus:

$$\chi_1 = \frac{h}{\gamma_1} \tag{6}$$

$$\chi_2 = \frac{\Delta h}{\gamma_2} \tag{7}$$

$$\chi_3 = \frac{\Delta h}{\gamma_1} \tag{8}$$

$$\gamma_s(h) = \frac{h}{\Delta \chi + \chi_1} \tag{9}$$

From 2, 6, 7 and 8 above:

$$\Delta \chi + \chi_1 = \frac{\Delta h}{\gamma_2} - \frac{\Delta h}{\gamma_1} + \frac{h}{\gamma_1} \tag{10}$$

From 9 and 10 above:

$$\gamma_s(h) = \frac{h \cdot \gamma_2 \cdot \gamma_1}{\Delta h \cdot \gamma_1 - \Delta h \, \gamma_2 + h \, \gamma_2} \tag{11}$$

Rearranging, $$\gamma_s(h) = \frac{\gamma_1 \cdot \gamma_2}{\frac{\Delta h}{h}(\gamma_1 - \gamma_2) + \gamma_2} \tag{12}$$

$\gamma_s(h)$ is the sighting angle as a function of height above the ground and the selected values for the angle $\gamma_1$ of the first segment 16, the angle $-\gamma_2$ for the second segment 18, and the height $\Delta h$ of the transition point 34.

Figure 2:
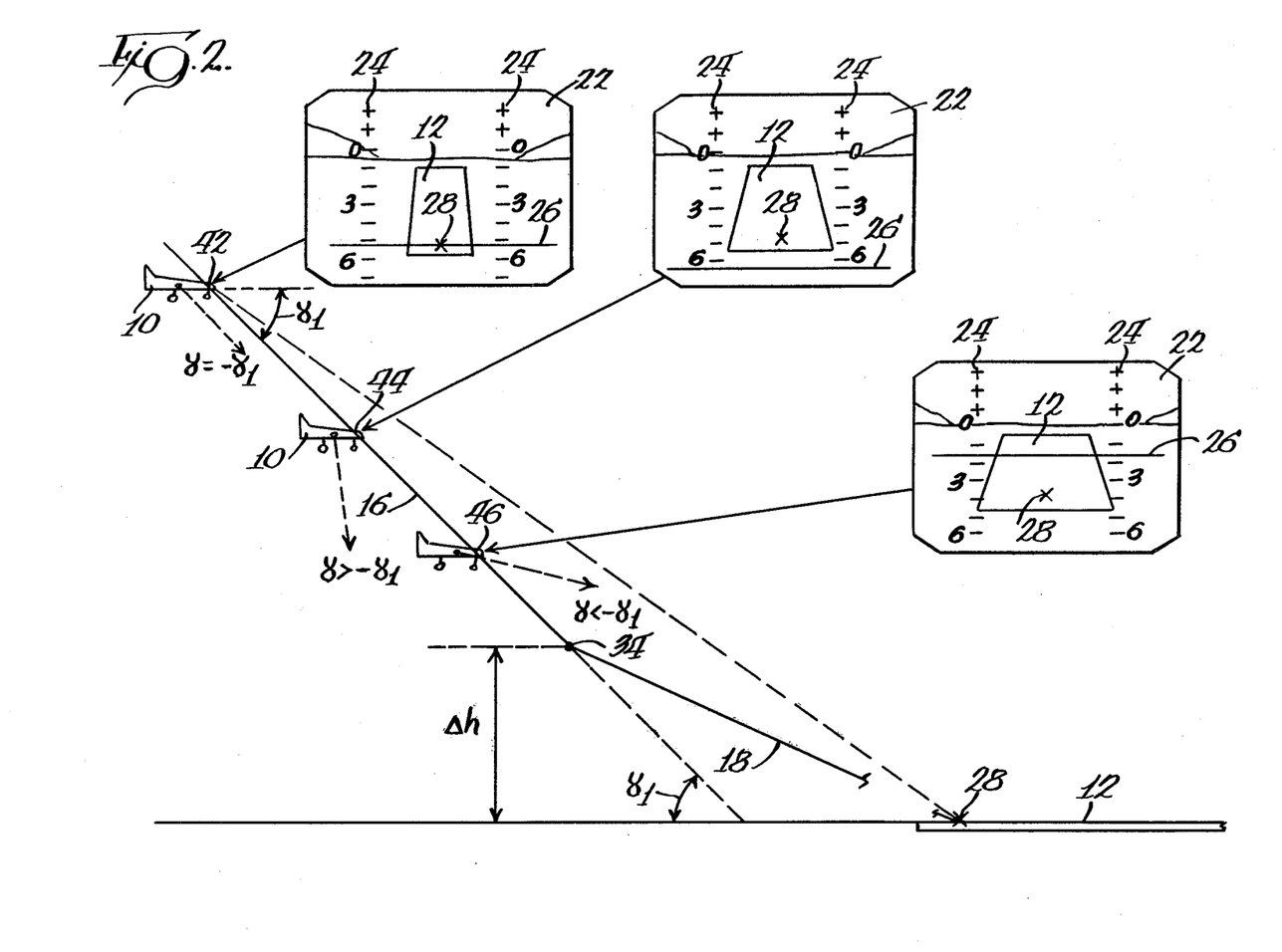
FIG. 2 is a diagram illustrating an aircraft flight path and sequence of flight guidance information for a multi-segment approach with trend information provided to the system.

Referring to FIG. 2, trend information may be provided to the head-up display 22 as the aircraft flies along the first segment 16. Trend information is an indication of where the aircraft is flying, as opposed to information regarding its location or position indicated by Equation (12) above. Reference is made to Muller U.S. Pat. No. 4,057,782 which discusses trend information in greater detail. When flight path bar 26 intersects the selected aiming point 28, the pilot is provided with the information that the aircraft 10 is flying along the first approach segment 16. When the flight path bar 26 is aligned with the aiming point 28 at point 42, the instantaneous flight angle $\gamma$ (shown by the dashed line arrow) equals $-\gamma_1$, indicating to the pilot that the wings are level and flight is along the selected angle $-\gamma_1$. As the aircraft 10 continues to descend along the first approach segment 16, and if the instantaneous flight path angle differs in magnitude from the selected angle $-\gamma_1$, flight path bar 26 will indicate the difference by moving vertically with respect to the selected aiming point in a direction which indicates the direction of the error. Specifically, at point 44, the instantaneous flight path angle $\gamma$ is greater than the selected angle $-\gamma_1$, causing flight path bar 26 to drop below selected aiming point 28. To correct for the difference between the instantaneous flight path angle $\gamma$ and $-\gamma_1$, the pilot brings the nose of the aircraft 10 up, causing the flight path of the aircraft to change. The change in flight path causes the flight path bar 26 to rise and ultimately intersect the aiming point 28 to indicate that the aircraft is again flying along the selected approach segment. Similarly, when aircraft 10 is flying along first approach segment 16 and the instantaneous flight path angle is less than $-\gamma_1$, such as shown at point 46, flight path bar 26 is driven to a point higher than aiming point 30. To correct for this condition, the pilot lowers the nose of aircraft 10, causing the flight path to change, which in turn causes bar 26 to drop, intersecting aiming point 30. Normal flight resumes along the first segment 16 when the flight path bar 26 again intersects the pilot-selected aiming point 30. Trend information provided to display 22 is an optional feature, but when selected, provides information as to where the plane is going for the entire first segment 16 of the approach path.

Trend information along the second segment 18 begins after the aircraft has traversed the transition point 34 and is provided to display 22 in a manner similar to that discussed in the copending application.

Figures 3, 5:
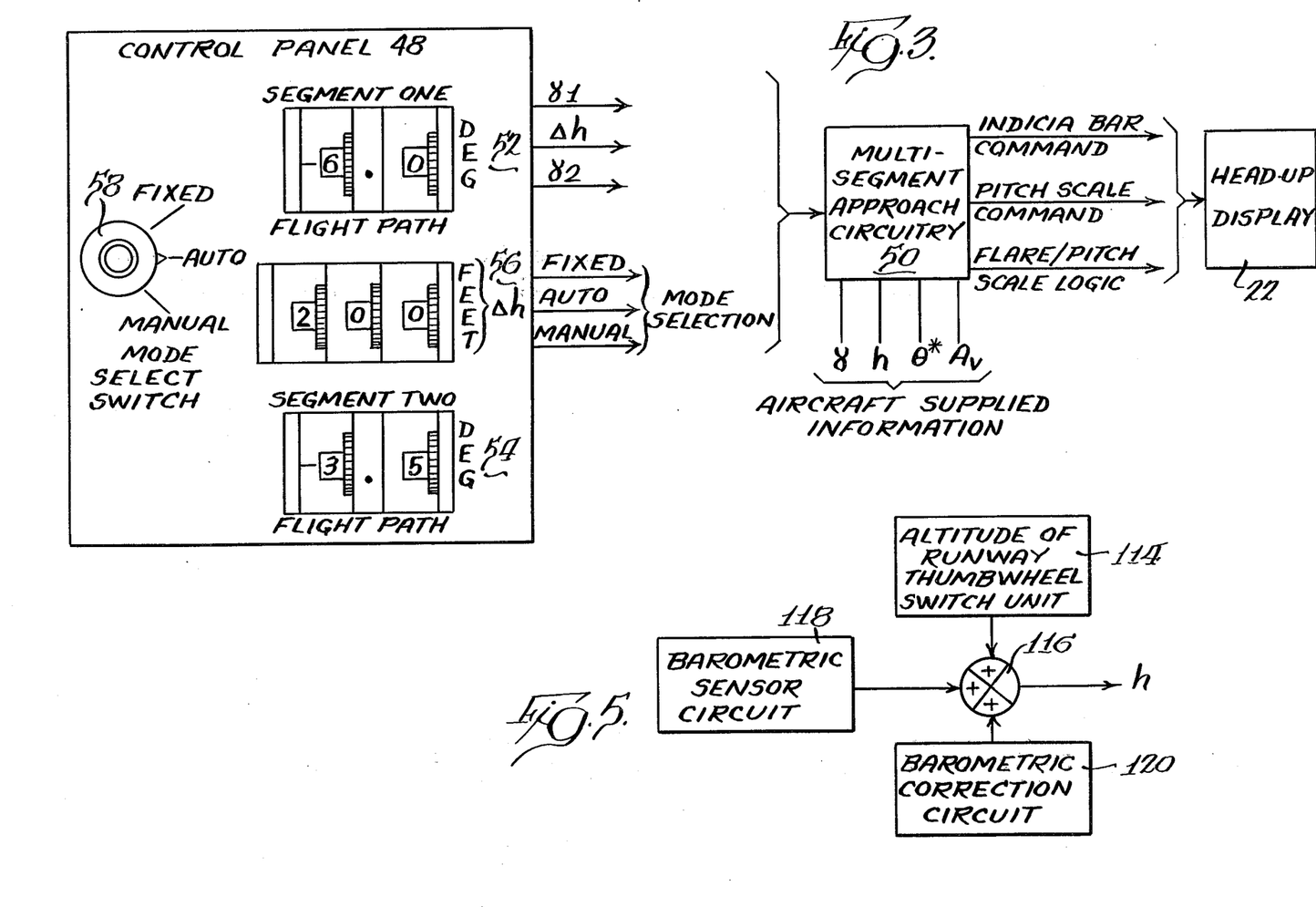
FIG. 3 is a block diagram of the control panel, multi-segment approach circuitry and the head-up display system.
FIG. 5 is a functional block diagram of a circuit for providing an accurate signal representing the altitude h of the aircraft above the ground.

The aircraft instrument of the present invention is shown in block diagram form in FIG. 3. Control panel 48 is placed within reach of the pilot and is coupled to multi-segment control circuitry 50 which may be suitably located in an instrument rack. Outputs from the multi-segment control circuit 50 are applied to head-up display 22 located in the cockpit.

Control panel 48 permits the pilot to enter the selected parameters as approach segment angles $-\gamma_1$, $-\gamma_2$ and $\Delta h$ into the multi-segment approach circuitry 50. Thumbwheel switch unit 52 permits the pilot to enter the selected angle $-\gamma_1$ for the first approach segment 16. As shown, $-\gamma_1$ is $-6.5°$. Similarly, thumbwheel switch unit 54 permits the pilot to enter the selected angle $-\gamma_2$ for the second approach segment 18. As shown, $-\gamma_2$ is selected at $-3.5°$. Thumbwheel switch unit 56 permits the pilot to enter the selected transition altitude $\Delta h$, as for example 200 feet. Although thumbwheel switch units are shown for entering the various parameters, it should be understood that the system could utilize a preselected set of parameters.

Mode selector switch 58 permits the pilot to choose whether he desires to provide trend information (auto mode) to head-up display 22 for flight along the first and second segments of the approach or whether he desires a single-segment approach (manual mode) rather than a multi-segment approach (auto mode or fixed mode).

Aircraft-supplied information is provided to the multi-segment approach circuitry 50, as best seen in FIG. 3. The information includes the instantaneous flight path angle $\gamma$, a computed pitch $\theta^*$ (see Muller U.S. Pat. No. 3,851,303), vertical acceleration $A_V$ and the altitude h of the aircraft above the ground. These signals are available from the circuitry provided in the copending application. Alternatively, however, the altitude h may be provided from the circuit shown in FIG. 5, as will be discussed in detail below.

The multi-segment approach control circuitry 50 has analog output signals which drive the flight path bar 26 and the pitch scale indicia 24 on head-up display 22. Logic signals control the illumination of the pitch scale and the flare symbols.

Figure 4A:
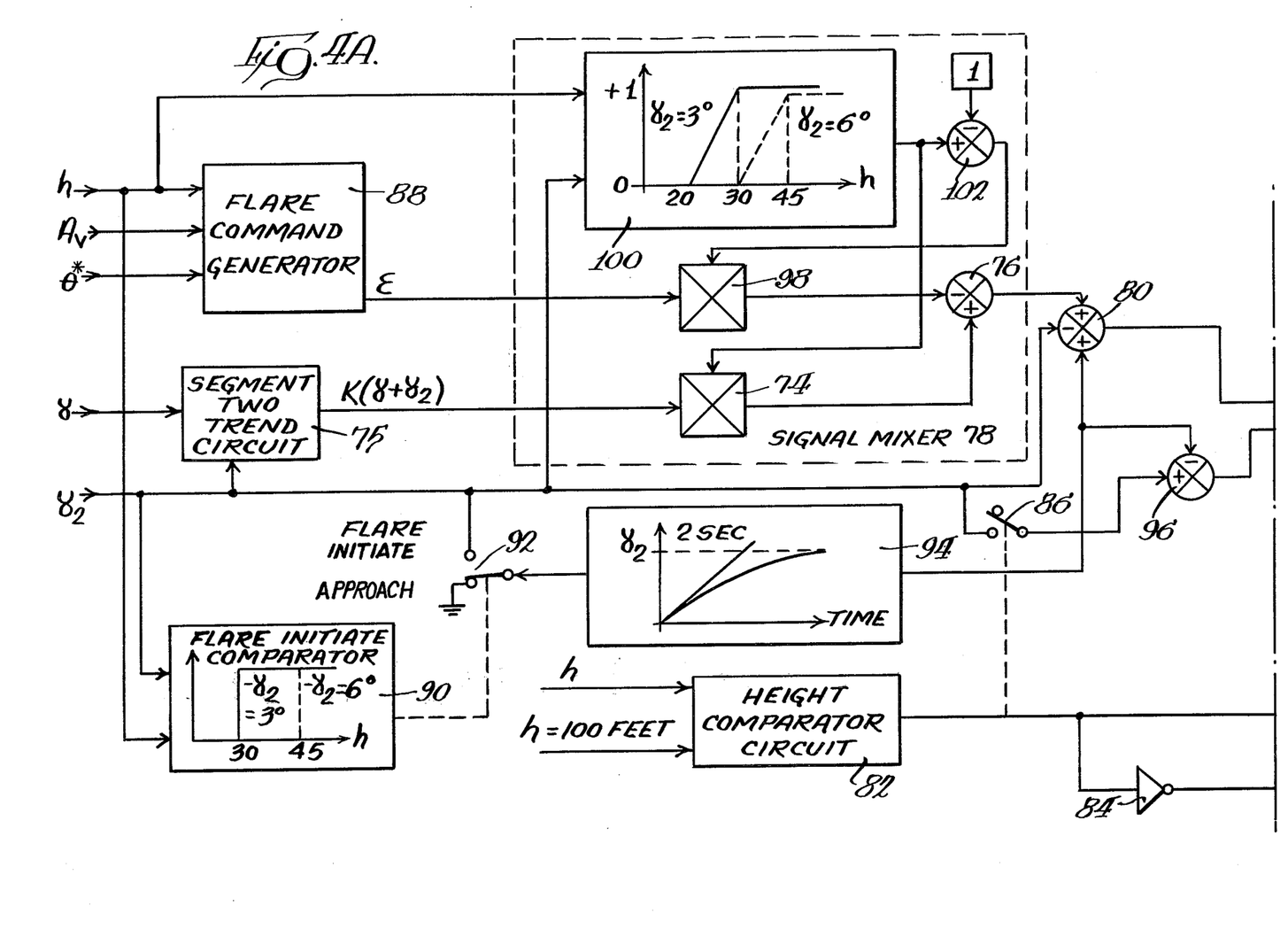
FIGS. 4A and 4B show a functional block diagram of the multi-segment approach circuitry.
Figure 4B:
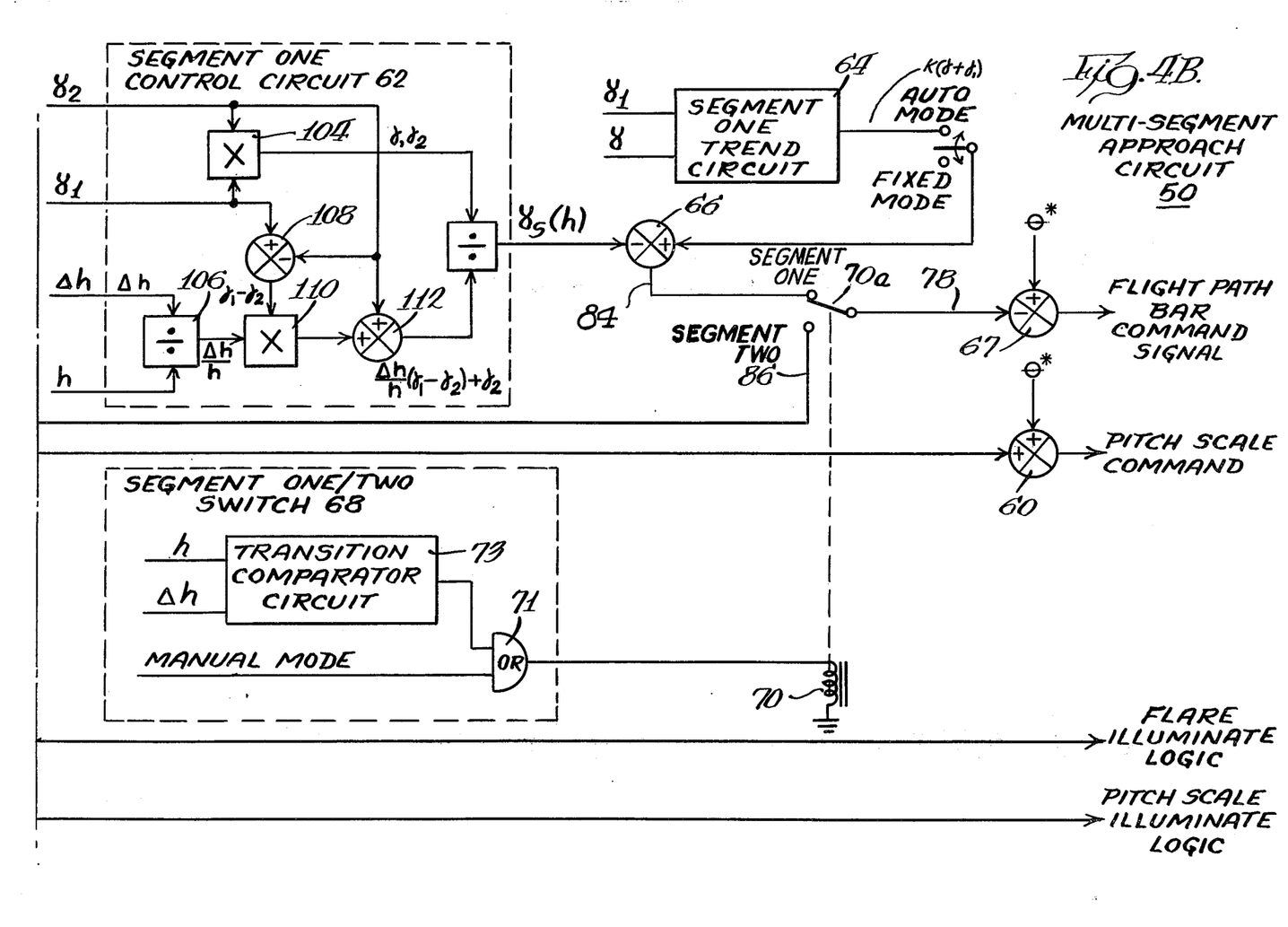

Referring to FIGS. 4A and 4B, the operation of the multi-segment approach circuit 50 will now be described. During flight along the first segment 16 of the approach path, pitch scale 24 is positioned in accordance with the calculated pitch signal $\theta^*$, which is applied to summing junction 60. The other input signal to summing junction 60 is zero. $\gamma_s(h)$ is provided from segment one control circuit 62. This signal is subtracted from an approach path command signal $K(\gamma+\gamma_1)$, representative of the trend information from segment one trend circuit 64, to provide a command signal for positioning flight path bar 26 if auto mode is selected. If fixed mode operation is selected, the input from the segment one trend circuit 64 to summing junction 66 is zero. $\gamma_s(h)$ with trend information, if selected, is subtracted from $\theta^*$ at summing junction 67 to provide the flight path bar command signal. The pilot operates the aircraft to align the flight path bar with the intended touchdown point on the runway during flight along the first segment 16 of the approach.

As flight along the first segment 16 continues, the aircraft descends to the transition point 34 (FIG. 1), where the segment one/two switch 68 energizes relay 70, closing switch 70a, positioning flight path indicia in accordance with $\gamma_2$. The operation of switch 68 is dependent upon the selection of the particular mode of operation as set by mode selector switch 58 (FIG. 3). If the mode selector switch 58 is set to manual mode, a signal is provided to OR circuit 71 causing relay 70 to energize. If the mode selector switch 58 is in the auto or fixed mode position, transition comparator 73 compares the altitude h of aircraft 10 to the height $\Delta h$ selected by the pilot and entered by thumbwheel switch 56. When the aircraft 10 descends to a level lower than selected height $\Delta h$, transition comparator 73 provides an output to OR circuit 71, causing relay 70 to be energized.

Segment two trend circuit 75 provides an approach path command signal $K(\gamma+\gamma_2)$ during flight along the second segment 18. The signal from trend circuit 75 is applied through multiplier 74 to summing junction 76 of signal mixer 78. The purpose and operation of the signal mixer 74 will be discussed below. $\gamma_2$ is subtracted from the approach path command signal during flight along the second segment 18 at summing junction 80. The output of summing junction 80 is subtracted from $\theta^*$ at summing junction 67 to provide the flight path bar command signal. The pilot operates the aircraft to align the flight path bar with the intended touchdown point on the runway during flight along the second segment 18.

At an altitude sufficiently above the flare initiate altitude to alert the pilot that the flare maneuver will commence shortly, pitch scale indicia 24 is extinguished and flare indicia dots 38 are illuminated. Typically, this may occur at an altitude of about 100 feet. Comparator 82 compares the altitude signal with a reference signal, as 100 feet, and generates an output signal illuminating the flare indicia dots. Inverter 84 provides an output signal to extinguish the pitch scale when the flare indicia dots are illuminated. The signal from height comparator 82 closes switch 86, and $\gamma_2$ is added to $\theta^*$ at summing junction 60. The flare indicia dots are mechanically aligned with the 0° marking of the pitch scale (see Kirschner U.S. Pat. No. 3,816,005, FIG. 11), and the addition of the $\gamma_2$ signal locates the dots at the appropriate flight path angle. The pilot continues descent along the approach path with flight path bar 26 superimposed on the flare indicia dots 38 and the intended touchdown point.

At the flare initiate altitude, both the flare indicia dots 38 and the flare path bar 26 move upwardly toward the horizon. Concurrently, the indicia bar command signal is gradually transferred from the approach path command signal, $K(\gamma+\gamma_2)$ to the flare command signal E from the flare command generator 88. The flare command signal is fully described in the copending application. A flare initiate comparator 90 determines when the aircraft has descended to the flare initiation altitude and actuates a switch 92 connecting $\gamma_2$ to exponential circuit 94 when that altitude is reached. The output of exponential circuit 94 starts at zero and increases toward $\gamma_2$ as a function of time. The exponential signal from circuit 94 reaches $\gamma_2$ in approximately two seconds. This signal is applied to summing junctions 80 and 96 where it is combined with $\gamma_2$ to move the flare symbol and bar indicia toward the horizon. The pilot continues operation of the aircraft to maintain the bar indicia aligned with the dots of the flare symbol until touchdown.

Signal mixer 78 operates following flare initiate to mix the approach path command signal $K(\gamma+\gamma_2)$ with the flare command signal E in inverse proportion as a function of the aircraft height. Flare command signal E from generator 88 is connected through multiplier 98 to summing junction 76. Control signals from multipliers 74 and 98 are derived from control signal generator 100 in accordance with the aircraft altitude along the second segment 18 of flight path. When the aircraft is above the flare initiate altitude, the output of circuit 100 is one and the approach path command signal is transmitted undiminished. At summing junction 102, one is subtracted from the output of circuit 160 and provides the control input to multiplier 98 which is cut off above flare initiate altitude. Below flare initiate altitude, the output of circuit 100 diminishes toward zero as a function of altitude, as shown. Thus, the gain of multiplier 74 is reduced while that of multiplier 98 is increased. Flare command signal E is connected to a negative input to summing junction 76 as the control factor of multiplier 98 is negative. In a typical system, the signal-mixing operation is completed as the aircraft descends 15 feet, a time somewhat less than 1.5 seconds.

The flare initiate altitude is preferably selected as a function of flight path angle. Accordingly, comparator 90 and control signal generator circuit 100 have inputs of $\gamma_2$. Typically, with the flight path angle $\gamma_2$ selected to be $-3°$, flare will be initiated at about 30 feet of altitude, while a flight path angle $\gamma_2$ of $-6°$ flare is initiated at 45 feet.

The operation of the segment one control circuit 62 will now be explained, it being remembered that the output $\gamma_s(h)$ is a function of aircraft height and is provided while the aircraft is flying the first segment 16 of the approach path. The inputs to the segment one control circuit 62 include $\gamma_1$, $\gamma_2$, $\Delta h$ from the control panel 48 and h, the aircraft altitude. Referring to Equation (12), the numerator thereof is acquired by multiplying $\gamma_1$ by $\gamma_2$ at multiplier 104. Divide circuit 106 divides $\Delta h$ by h and the quotient therefrom is multiplied by $(\gamma_1-\gamma_2)$ from summing junction 108 at multiplier 110.

The product from multiplier 110 is applied to summing junction 112 where it is summed with $\gamma_2$. The term $\Delta h/h(\gamma_1-\gamma_2)+\gamma_2$ from the summing junction 112 is divided into $\gamma_1\gamma_2$ by divider circuit 114 to provide $\gamma_s(h)$ therefrom.

In the event that the aircraft is not equipped with a radio altimeter, the circuit of FIG. 5 may be used to develop an accurate signal representative of aircraft altitude. The known altitude of the runway is acquired by examining a chart and is entered by thumbwheel switch unit 114. The output from the thumbwheel switch is applied to summer 116. A barometric sensor circuit 118 senses atmospheric pressure to provide a signal representative of aircraft altitude to summer 116. Circuit 120 provides a signal representative of a barometric correction which is applied to summer 116. The signal h from summer 116 accurately represents the altitude of the aircraft above the ground.

I claim:

1. In a head up visual approach aircraft instrument having a screen on which the pilot of an aircraft views a collimated display of flight guidance information against a background of the outside world, the display including a pitch stabilized reference indicia, flight path indicia movable vertically on the screen representing the flight path of the aircraft, for alignment with a pilot-selected outside world aiming point by manipulation of the attitude and speed of the aircraft, to follow an approach path to the point of initiation of a flare maneuver, said approach path having two successive straight line segments, the first being at a steeper angle than the second, and the second being directed toward said aiming point, an improved means for positioning said flight path indicia, comprising:

means for establishing the angles of said approach path segments;

means for measuring the aircraft altitude;

means for positioning said flight path indicia on the screen during the first segment of the approach in accordance with a first approach path command which is a function of the aircraft altitude and the selected angles of the approach path segments, for the flight path of the aircraft to follow the first approach path segment as the pilot maintains said indicia in alignment with said aiming point; and means for positioning said flight path indicia on the screen during the second approach segment in accordance with a second approach path command which is a function of the angle of the second approach segment for the aircraft to follow the second approach path segment as the pilot maintains said indicia in alignment with said aiming point.

2. The instrument of claim 1 wherein said means for positioning the flight path indicia during the first segment of the approach is actuated by a command represented by the expression $$\frac{\gamma_1 \cdot \gamma_2}{\frac{\Delta h}{h}(\gamma_1 - \gamma_2) + \gamma_2}$$

where $\gamma_1$ is the angle of the first approach path segment, $\gamma_2$ is the angle of the second approach path segment, h is the altitude of the aircraft above the ground and $\Delta h$ is the altitude at which the first segment intersects the second segment.

3. The instrument of claim 2 wherein said indicia positioning means for the first segment of the approach provides a command signal proportional to the equation and includes:

means for dividing $\Delta h$ by h to provide $\Delta h/h$;
means for subtracting $\gamma_2$ from $\gamma_1$ to provide $(\gamma_1-\gamma_2)$;
means for multiplying $(\gamma_1-\gamma_2)$ by $\Delta h/h$ to provide $\Delta h/h(\gamma_1-\gamma_2)$;
means for adding $\gamma_2$ to $\Delta h/h(\gamma_1-\gamma_2)$ to provide $\Delta h/h(\gamma_1-\gamma_2)+\gamma_2$;
means for multiplying $\gamma_1$ by $\gamma_2$ to provide $\gamma_1\cdot\gamma_2$; and
means for dividing $\gamma_1\cdot\gamma_2$ by $(\Delta h/h(\gamma_1-\gamma_2)+\gamma_2$ to provide the command signal.

4. The instrument of claim 2 wherein said means for positioning the flight path indicia during the first segment of the approach is actuated by a command represented by the expression $$\Theta^* = \frac{\gamma_1 \cdot \gamma_2}{\frac{\Delta h}{h}(\gamma_1 - \gamma_2) + \gamma_2}$$

where $\theta^*$ is the pitch angle of the aircraft.

5. The instrument of claim 4 wherein a circuit provides a command signal for the flight path indicia along said first segment and includes:

a source of signal representing $\theta^*$;
a source of signal representing:

$$\frac{\gamma_1 \cdot \gamma_2}{\frac{\Delta h}{h}(\gamma_1 - \gamma_2) + \gamma_2};$$

and
means for subtracting $$\frac{\gamma_1 \cdot \gamma_2}{\frac{\Delta h}{h}(\gamma_1 - \gamma_2) + \gamma_2}$$

from $\theta^*$ during said first approach segment.

6. The instrument of claim 4 further including:
a source of signal representing the actual flight path $\gamma$; and
means for summing a signal representing a function of the actual flight path angle with $$\frac{\gamma_1 \cdot \gamma_2}{\frac{\Delta h}{h}(\gamma_1 - \gamma_2) + \gamma_2}$$

during said first approach segment.

7. The instrument of claim 2 further including:
means for vertically displacing said flight path indicia indicia in accordance with the difference between the actual flight angle $\gamma$ and $-\gamma_1$ during flight along the first approach segment and then in accordance with the difference between the actual flight path angle $\gamma$ and angle $\gamma_2$ during flight along the second approach segment.

8. The instrument of claim 1 including means for pilot-selection of $\gamma_1$, $\gamma_2$ and $\Delta h$.

9. The instrument of claim 1 wherein the angles of the first and second approach path segment are of the order of $-6°$ and $-3°$, respectively.

10. In an aircraft instrument having a head-up display in which pilot guidance information is viewed against a background of the outside world, the pilot guidance information including flight path indicia for alignment with an outside world target, and improved indicia command signal source to position the indicia to guide the pilot along a flight path at an angle to the line of sight from the pilot to the outside world target, comprising:

a source of signal representing the flight path angle;
a source of signal representing altitude of the aircraft above the ground; and
means operable as a function of the flight path angle and the aircraft altitude to position the flight path indicia on the line of sight of the pilot to the target and to move the indicia to maintain the sight line of the pilot to the target as the aircraft altitude changes.

* * * * *